United States Patent
Sawyer et al.

(10) Patent No.: US 10,272,744 B2
(45) Date of Patent: Apr. 30, 2019

(54) VEHICLE HVAC SYSTEM WITH AUXILIARY COOLANT LOOP FOR HEATING AND COOLING VEHICLE INTERIOR

(71) Applicant: FORD GLOBAL TECHNOLOGIES, LLC, Dearborn, MI (US)

(72) Inventors: Robert Steven Sawyer, Farmington Hills, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 14/844,277

(22) Filed: Sep. 3, 2015

(65) Prior Publication Data

US 2017/0066304 A1    Mar. 9, 2017

(51) Int. Cl.
*B60H 1/00* (2006.01)
*B60H 3/00* (2006.01)
(Continued)

(52) U.S. Cl.
CPC ......... *B60H 1/323* (2013.01); *B60H 1/00064* (2013.01); *B60H 1/00328* (2013.01);
(Continued)

(58) Field of Classification Search
CPC ............ B60H 1/00328; B60H 1/00321; B60H 1/00357; B60H 1/00885; B60H 1/323;
(Continued)

(56) References Cited

U.S. PATENT DOCUMENTS 3,127,928 A * 4/1964 Ringquist ................. F24F 3/08
                                                165/221
5,265,437 A * 11/1993 Saperstein ........... B60H 1/3229
                                                 62/243
(Continued)

FOREIGN PATENT DOCUMENTS

EP       1291206 B1    5/2008
WO     03106203 A2    12/2003

OTHER PUBLICATIONS

English translation of WO03106203A2.
English translation of EP1291206B1.

*Primary Examiner* — Jason M Thompson
(74) *Attorney, Agent, or Firm* — Vichit Chea; King & Schickli, PLLC (57) ABSTRACT

A vehicle includes a heating, ventilation and air conditioning (HVAC) system for heating and cooling a passenger compartment. The HVAC system includes a refrigerant loop operable in a cooling mode and a heating mode, and an auxiliary coolant loop for heating and cooling at least a portion of the passenger compartment. The auxiliary coolant loop includes a pump for moving a coolant, within the auxiliary coolant loop, through a first heat exchanger coupled to the refrigerant loop via an expansion device in the cooling mode, a second heat exchanger positioned within the passenger compartment, and a third heat exchanger coupled to the refrigerant loop, and a flow control valve. The temperature of the coolant within the auxiliary coolant loop is controlled utilizing the flow control valve and the pump. The first and third heat exchangers may be in parallel for controlling the movement of coolant therebetween to control temperature.

7 Claims, 5 Drawing Sheets

(51) Int. Cl.
*B61D 27/00* (2006.01)
*B60H 1/32* (2006.01)
*B60H 1/08* (2006.01)

(52) U.S. Cl.
CPC ........... *B60H 1/00885* (2013.01); *B60H 1/08* (2013.01); *B60H 2001/002* (2013.01)

(58) Field of Classification Search
CPC ................. B60H 1/00342; B60H 1/08; B60H 2001/002; B60H 1/00064; B60H 1/00492
USPC .......................................... 165/41, 42, 202
See application file for complete search history.

(56) References Cited

U.S. PATENT DOCUMENTS

| | | | |
|---|---|---|---|
| 5,421,169 A | 6/1995 | Benedict | |
| 5,784,893 A * | 7/1998 | Furuhama | C09K 5/041 62/333 |
| 6,038,877 A * | 3/2000 | Peiffer | B60H 1/00007 62/244 |
| 6,745,829 B2 * | 6/2004 | Mehraban | B60H 1/00885 165/203 |
| 2001/0027663 A1 * | 10/2001 | Zeigler | B60H 1/00007 62/406 |
| 2002/0014330 A1 | 2/2002 | Guyonvarch | |
| 2008/0245503 A1 * | 10/2008 | Wilson | B60H 1/00371 165/42 |
| 2011/0197611 A1 * | 8/2011 | Hall | B60H 1/00378 62/238.7 |
| 2016/0107505 A1 * | 4/2016 | Johnston | B60H 1/00385 165/202 |

\* cited by examiner

VEHICLE HVAC SYSTEM WITH AUXILIARY COOLANT LOOP FOR HEATING AND COOLING VEHICLE INTERIOR

TECHNICAL FIELD

This document relates generally to vehicle heating/cooling systems, and more specifically to a vehicle heating, ventilating, and air conditioning system with an auxiliary coolant loop.

BACKGROUND

It is well known to utilize auxiliary heating, ventilating, and air conditioning (HVAC) systems in vehicles. These auxiliary HVAC systems are typically either a blended air system, which is similar to a forced air HVAC system used as a primary HVAC system, or an air conditioning only or heater only system. These auxiliary HVAC systems are typically positioned within a passenger compartment of the vehicle. More specifically, auxiliary HVAC systems are often positioned either in the rear trim assembly, a center console, under a seat, or otherwise within the compartment.

As with the primary HVAC system, these auxiliary HVAC systems typically have a large footprint or package size considering their positioning within the passenger compartment. In fact, these auxiliary HVAC systems often include some or all of the following, an evaporator core, a heater core, an electric heater, a blower and wheel assembly, a blower speed controller, doors, actuators and ducts. Even more, the duct system for the auxiliary HVAC system in larger vehicles, such as sports utility vehicles (SUVs), crossover utility vehicles (CUVs), vans and hybrid vehicles, is typically extensive and extends throughout the passenger compartment in order to distribute conditioned air to varied locations within the compartment (e.g., a second, a third, a fourth, or a fifth row of the vehicle).

While the larger vehicles may provide more cubic feet within the passenger compartment than smaller, more compact, vehicles, the additional space is often utilized for various desired features (e.g., three plus person seating across each row of the passenger compartment). In these scenarios, space within the passenger compartment can become limited. Accommodating this type of seating arrangement or other desired features and a large auxiliary HVAC system, for example, can be difficult and burdensome on vehicle designers. Accordingly, a need exists for an auxiliary HVAC system capable of heating and cooling a passenger compartment, or zones within a passenger compartment, while maintaining a minimal footprint or package size to provide increased flexibility for the vehicle designers.

The auxiliary HVAC system would utilize an auxiliary coolant loop system which is small in size and allows for shorter duct runs for multi-zone conditioning throughout the passenger compartment. Even more, fewer and/or possibly smaller heat exchangers can be utilized limiting the overall package size or footprint of the auxiliary HVAC system. Such an auxiliary HVAC system could also provide spot heating and cooling for lower energy consumption compared to full passenger compartment solutions, and component cooling where components are temperature critical (a a battery pack).

SUMMARY OF THE INVENTION

In accordance with the purposes and benefits described herein, a vehicle is provided. The vehicle may be broadly described as comprising a heating, ventilation and air conditioning (HVAC) system for heating and cooling a passenger compartment, the HVAC system including a refrigerant loop and being operable in a cooling mode and a heating mode, and an auxiliary coolant loop for heating and cooling at least a portion of the passenger compartment, the auxiliary coolant loop including a pump for moving a coolant, within the auxiliary coolant loop, through a first heat exchanger coupled to the refrigerant loop in the cooling mode, a second heat exchanger positioned within the passenger compartment, a flow control valve, and a third heat exchanger coupled to the refrigerant loop, and an expansion device. The temperature of the coolant within the auxiliary coolant loop is controlled utilizing at least one of the flow control valve and the pump.

In one possible embodiment, the second heat exchanger is a coolant to air heat exchanger. In another possible embodiment, the vehicle further includes a blower for moving air through the second heat exchanger and into the passenger compartment. In yet another possible embodiment, the vehicle further includes at least one vent through which the air enters the passenger compartment.

In still another possible embodiment, the first heat exchanger and the third heat exchanger are connected in parallel, the flow control valve is a two way valve for controlling the movement of coolant to the first heat exchanger and the third heat exchanger, and the pump is connected between the second heat exchanger and the flow control valve.

In another possible embodiment, the auxiliary coolant loop further includes a fourth heat exchanger positioned within the passenger compartment, a fifth heat exchanger coupled to the refrigerant loop, and a second flow control valve. Even more, a second temperature of the coolant moving through the fourth heat exchanger within the auxiliary coolant loop is controlled utilizing the second flow control valve and the pump.

In still another possible embodiment, the fourth heat exchanger is a coolant to air heat exchanger, and the vehicle further includes a second blower for moving air through the fourth heat exchanger and into the passenger compartment.

In yet still another possible embodiment, the auxiliary coolant loop further includes a valve for selectively directing the moving coolant through a compartment for housing a component therein in order to regulate a temperature of the component.

In another possible embodiment, the expansion device is utilized to further control the temperature of the coolant within the auxiliary coolant loop in the cooling mode.

In a second possible embodiment, a vehicle includes a passenger compartment having a plurality of zones, a heating, ventilation and air conditioning (HVAC) system for heating and cooling the passenger compartment, the HVAC system including a refrigerant loop and operable in a cooling mode and a heating mode, and an auxiliary coolant loop for heating and cooling the plurality of zones within the passenger compartment, the auxiliary coolant loop including a pump for moving a coolant, within the auxiliary coolant loop, through a first heat exchanger coupled to the refrigerant loop via an expansion device in the cooling mode, and through a plurality of loops connected in parallel to the pump and the first heat exchanger, each of the plurality of loops includes a second heat exchanger positioned within the passenger compartment, a flow control valve, and a third heat exchanger coupled to the coolant loop. The temperature of the coolant within each of the plurality of loops is controlled utilizing the pump and the flow control valve of each of the plurality of loops.

In another possible embodiment, the expansion device is utilized to further control the temperature of the coolant within the auxiliary coolant loop in the cooling mode.

In yet another possible embodiment, each of the each of the plurality of loops is associated with a zone of the plurality of zones.

In still another possible embodiment, each of the second heat exchangers is a coolant to air heat exchanger.

In yet still another possible embodiment, the vehicle further includes a plurality of blowers, wherein each of the plurality of loops includes at least one blower of the plurality of blowers for moving air through the second heat exchanger of the each of the plurality of loops and into the passenger compartment.

In another possible embodiment, the vehicle further includes a plurality of vents, and each of the plurality of vents is associated with at least one of the plurality of blowers, through which the air enters into the passenger compartment.

In yet another possible embodiment, each of the plurality of loops includes one of the plurality of blowers and one of the plurality of vents, and is associated with one zone of the plurality of zones.

In accordance with the purposes and benefits described herein, a method is provided of heating and cooling at least one zone of a passenger compartment in a vehicle having a heating, ventilation and air conditioning (HVAC) system including a refrigerant loop and operable in a cooling mode and a heating mode for heating and cooling the passenger compartment through vents positioned within a front console comprising the steps of: (a) pumping coolant through an auxiliary coolant loop; (b) changing a temperature of the coolant utilizing a first heat exchanger associated with the refrigerant loop via an expansion device in the cooling mode, and a second heat exchanger associated with the refrigerant loop; and (c) moving air through a third heat exchanger through which the coolant moves, the third heat exchanger positioned in the passenger compartment, and at least one vent positioned within the at least one zone of the passenger compartment.

In another possible embodiment, the step of changing a temperature of the coolant includes controlling a coolant flow through the second heat exchanger utilizing at least one of a flow valve and a pump.

In yet another possible embodiment, the first heat exchanger and the third heat exchanger are connected in parallel, the flow valve is a two way valve, and the pump is connected between the second heat exchanger and the flow valve, and further comprising the step of (d) controlling the movement of coolant between the first heat exchanger and the third heat exchanger utilizing the flow valve.

In still another possible embodiment, the method further includes the step of (e) directing at least a portion of the coolant within said auxiliary coolant loop through a compartment for housing a component therein in order to regulate a temperature of the component.

In the following description, there are shown and described several embodiments of a vehicle utilizing an auxiliary coolant loop for controlling a temperature within a passenger compartment and related method of heating and cooling at least one zone of the passenger compartment incorporating same. As it should be realized, the methods and systems are capable of other, different embodiments and their several details are capable of modification in various, obvious aspects all without departing from the vehicles and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and method and together with the description serve to explain certain principles thereof. In the drawing figures.

Reference will now be made in detail to the present preferred embodiments of the vehicle utilizing an auxiliary coolant loop for controlling a temperature within a passenger compartment and related method of heating and cooling at least one zone of the passenger compartment, examples of which are illustrated in the accompanying drawing figures, wherein like numerals are used to represent like elements.

DETAILED DESCRIPTION

Figure 1:
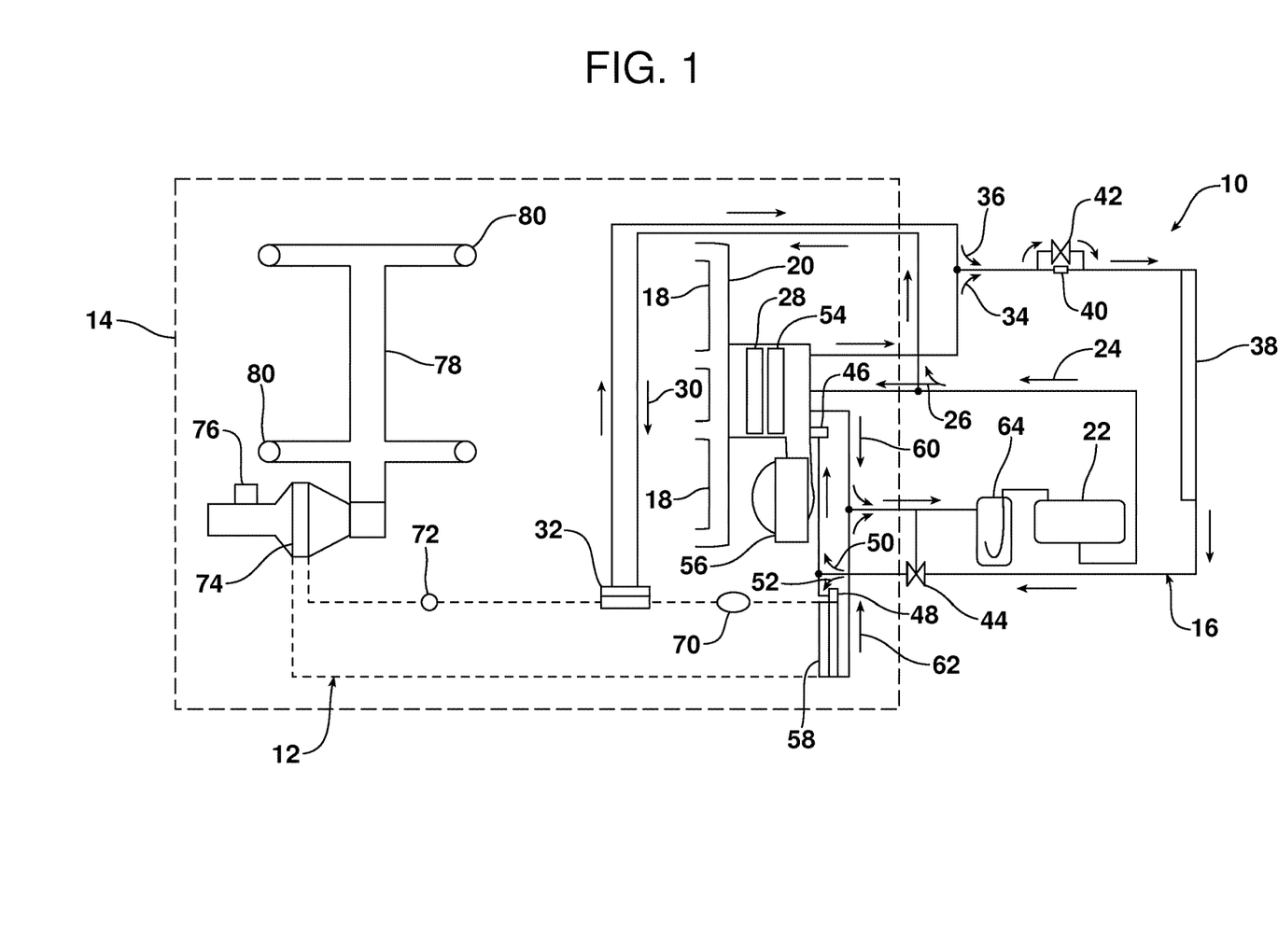
FIG. 1 is a schematic diagram of a vehicle heating, ventilation and air conditioning (HVAC) system operating in a cooling mode and having an auxiliary coolant loop for heating and/or cooling at least a portion of a passenger compartment.
Figure 2:
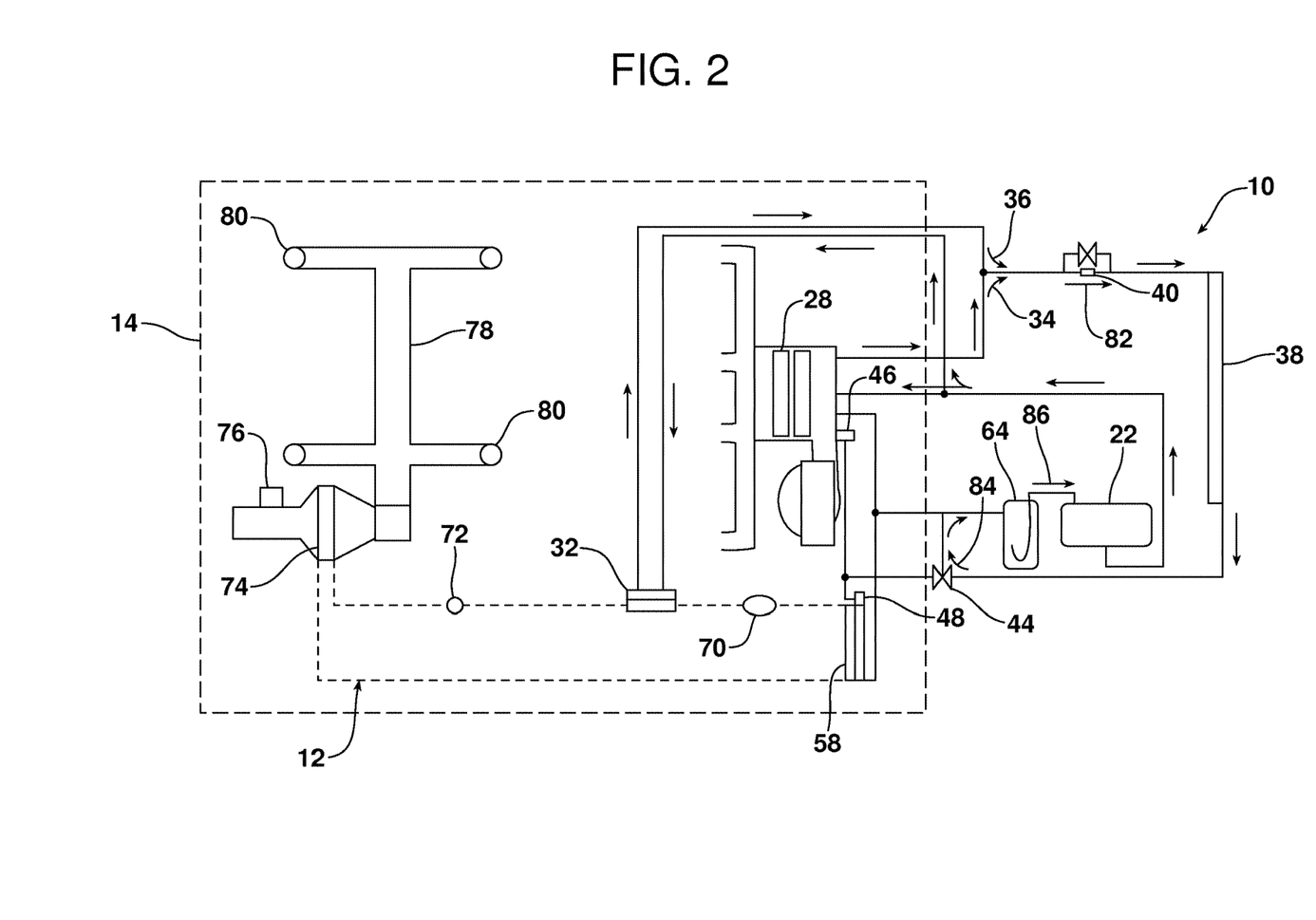
FIG. 2 is a schematic diagram of the vehicle HVAC system operating in a heating mode and having an auxiliary coolant loop for heating and/or cooling at least a portion of a passenger compartment.

Reference is now made to FIGS. 1 and 2 illustrating a schematic diagram of a typical vehicle heating and cooling system 10 coupled to an auxiliary coolant loop 12 for heating and cooling at least a portion of a passenger compartment 14. FIG. 1 illustrates the vehicle cooling and heating system 10 operating in a cooling mode and FIG. 2 illustrates the system operating in a heating mode. The vehicle cooling and heating system 10 includes a heat pump main heating, ventilation and air conditioning (HVAC) system including a refrigerant loop 16 for heating and cooling the passenger compartment 14 through vents 18 positioned within a front console 20.

In the described embodiment, the heat pump includes an electric compressor 22 utilized in hybrid vehicles. In operation, the compressor 22 compresses a fluid, which is a refrigerant in the described embodiment, thereby raising a temperature of the refrigerant. The high temperature, high pressure gas refrigerant leaves the compressor 22, as shown by action arrow 24, where its flow is divided as shown by combined action arrows 26.

A portion of the high temperature, high pressure gas refrigerant flows through a front heater to air heat exchanger 28 which generally has no effect in the cooling mode, and another portion, shown by action arrow 30, flows through a hot refrigerant to coolant heat exchanger 32 where heat from the gas refrigerant is transferred to the coolant within the auxiliary coolant loop 12. In the described embodiment, the hot refrigerant to coolant heat exchanger 32 is positioned within the passenger compartment 14. In alternate embodiments, the hot refrigerant to coolant heat exchanger may be located under the vehicle or within the engine compartment.

The portions of now lowered temperature, high pressure refrigerant gas flowing from both the front heater to air heat exchanger 28 and the hot refrigerant to coolant heat exchanger 32 are recombined, as shown by action arrows 34 and 36, before flowing to a condenser 38. In the cooling mode, the lowered temperature, high pressure refrigerant gas bypasses a first (heating) expansion device 40 through a by-pass valve 42 and flows into the condenser 38. Flowing through the by-pass valve 42 has substantially no effect on the refrigerant.

Broadly speaking, the condenser 38 is positioned in the described embodiment at a front section of an engine compartment and further cools the refrigerant. Within the condenser or outside heat exchanger 38, the refrigerant gas is condensed due primarily to the effect of outside air, and liquefied. Although not shown, the vehicle may include griller shutters and a fan to control an amount of air allowed to pass over the outside heat exchanger.

The high pressure, liquefied refrigerant is then sent through a two-way valve 44 and portions of the liquid refrigerant flow to a second (cooling) expansion device 46 and a third (cooling) expansion device 48, as shown by action arrows 50 and 52 respectively. In the second (cooling) expansion device 46, the liquid refrigerant is expanded to become a low-temperature, low-pressure liquid and vapor mixture refrigerant. This low-temperature, low-pressure liquid and vapor mixture refrigerant is supplied to a refrigerant to air heat exchanger or evaporator 54. Regulation of the flow of refrigerant, or throttling, is used to control the temperature of the refrigerant within the evaporator 54. Increasing the flow of refrigerant necessarily lowers the temperature.

In the cooling mode, warm, moist air flowing across the evaporator 54 transfers its heat to the cooler refrigerant within the evaporator. The byproducts are a lowered temperature air and condensation from the air that is routed from the evaporator 54 to an exterior of the vehicle. A blower 56 blows air across the evaporator 54 and through the one or more vents 18 to the passenger compartment 14. This process results in the passenger compartment 14 having a cooler, drier air therein.

In the third (cooling) expansion device 48, the liquid refrigerant is similarly expanded to become a low-temperature, low-pressure liquid and vapor mixture refrigerant. This low-temperature, low-pressure liquid and vapor mixture refrigerant is supplied to a refrigerant to coolant heat exchanger 58 associated with the auxiliary cooling loop 12 where heat is transferred from the coolant within the auxiliary coolant loop to the refrigerant. Again, in the described embodiment, the refrigerant to coolant heat exchanger 58 is positioned within the passenger compartment 14 but in alternate embodiments, the refrigerant to coolant heat exchanger may be located under the vehicle or within the engine compartment. Also, regulation of the flow of refrigerant, or throttling, is used to control the temperature of refrigerant within the refrigerant to coolant heat exchanger 58. Increasing the flow of refrigerant necessarily lowers the temperature of the coolant within the auxiliary coolant loop 12.

The low pressure refrigerant exits the evaporator 54, as shown by action arrow 60, recombines with low pressure refrigerant exiting the refrigerant to coolant heat exchanger, as shown by action arrow 62, and enters an accumulator 64. Liquid is accumulated in the accumulator 64 to prevent liquid from entering the compressor 22. A low pressure, gas refrigerant exits the accumulator 64 and is received in the compressor 22 where the refrigerant is again compressed and cycled through the system 10.

Within the auxiliary coolant loop 12, a pump 70 moves coolant through the loop including a flow control valve 72. Together, the pump 70 and flow control valve 72 control the coolant temperature. As indicated above, the coolant absorbs heat as it passes through the hot refrigerant to coolant heat exchanger 32 before being pumped into the refrigerant to coolant heat exchanger 58. In the cooling mode, the refrigerant passing through the refrigerant to coolant heat exchanger 58 is cooled utilizing the second (cooling) expansion device 48. The cooled coolant then moves to a coolant to air heat exchanger 74 positioned within the passenger compartment 14. A blower 76 creates a flow of air across the coolant to air heat exchanger 74. The warm, moist air flowing across the coolant to air heat exchanger 74 transfers its heat to the cooler coolant within the coolant to air heat exchanger. The cooled air flows into ducting 78 and out one or more vents 80 positioned within the passenger compartment 14. This process results in the passenger compartment 14 having a cooler, drier air therein.

In the heating mode shown in FIG. 2, the refrigerant flows much the same as in the cooling mode described above. The portion of the high temperature, high pressure gas refrigerant flowing through the front heater to air heat exchanger 28, however, transfers its heat to the cooler air flowing across the heater to air heat exchanger. A blend door (not shown) is commonly used to regulate the flow of air created by the blower 56 allowing air to travel through, or partially through, the front heater to air heat exchanger 28. The byproducts are a raised temperature air and a lowered temperature, high pressure gas refrigerant. This process results in the passenger compartment 14 having a warmer air therein.

The other portion of the high temperature, high pressure gas refrigerant flows through the hot refrigerant to coolant heat exchanger 32 where heat from the gas refrigerant is transferred to the coolant moving within the auxiliary coolant loop 12. The portions of now lowered temperature, high pressure refrigerant gas flowing from both the front heater to air heat exchanger 28 and the hot refrigerant to coolant heat exchanger 32, as shown by action arrows 34 and 36 are recombined before flowing to the condenser 38 as described above. In the heating mode, however, the lowered temperature, high pressure refrigerant gas passes through the first (heating) expansion device 40 as shown by action arrow 82. Within, the first (heating) expansion device 40, the high-pressure refrigerant gas is expanded to become a low-temperature, low-pressure liquid and vapor mixture refrigerant which is supplied to the condenser 38. The liquid and vapor mixture refrigerant is condensed due primarily to the effect of outside air, and liquefied.

The low pressure, liquefied refrigerant is then sent through the two-way valve 44, as shown by action arrow 84, which routes the refrigerant straight to the accumulator 64, in the heating mode, avoiding the second (cooling) heat exchanger 54 and the third (cooling) heat exchanger 58.

Again, the low pressure refrigerant liquid is accumulated in the accumulator 64 to prevent liquid from entering the compressor 22. The low pressure, gas refrigerant exits the accumulator 64, as shown by action arrow 86, and is received in the compressor 22 where the refrigerant is again compressed and cycled through the system 10.

Since no refrigerant is moving through the second (cooling) expansion device 46 or the refrigerant to coolant heat exchanger 58, the coolant moving within the auxiliary coolant loop 12 remains warmed by the transfer of heat within the hot refrigerant to coolant heat exchanger 32. The warmed coolant then moves to the coolant to air heat exchanger 74 positioned within the passenger compartment 14. The blower 76 creates a flow of air across the coolant to air heat exchanger 74 resulting in a warming of the air flowing across the coolant to air heat exchanger. The warmed air flows into the ducting 78 and out the one or more vents 80 positioned within the passenger compartment 14. This process results in the passenger compartment 14 having a warmer air therein.

Figure 3:
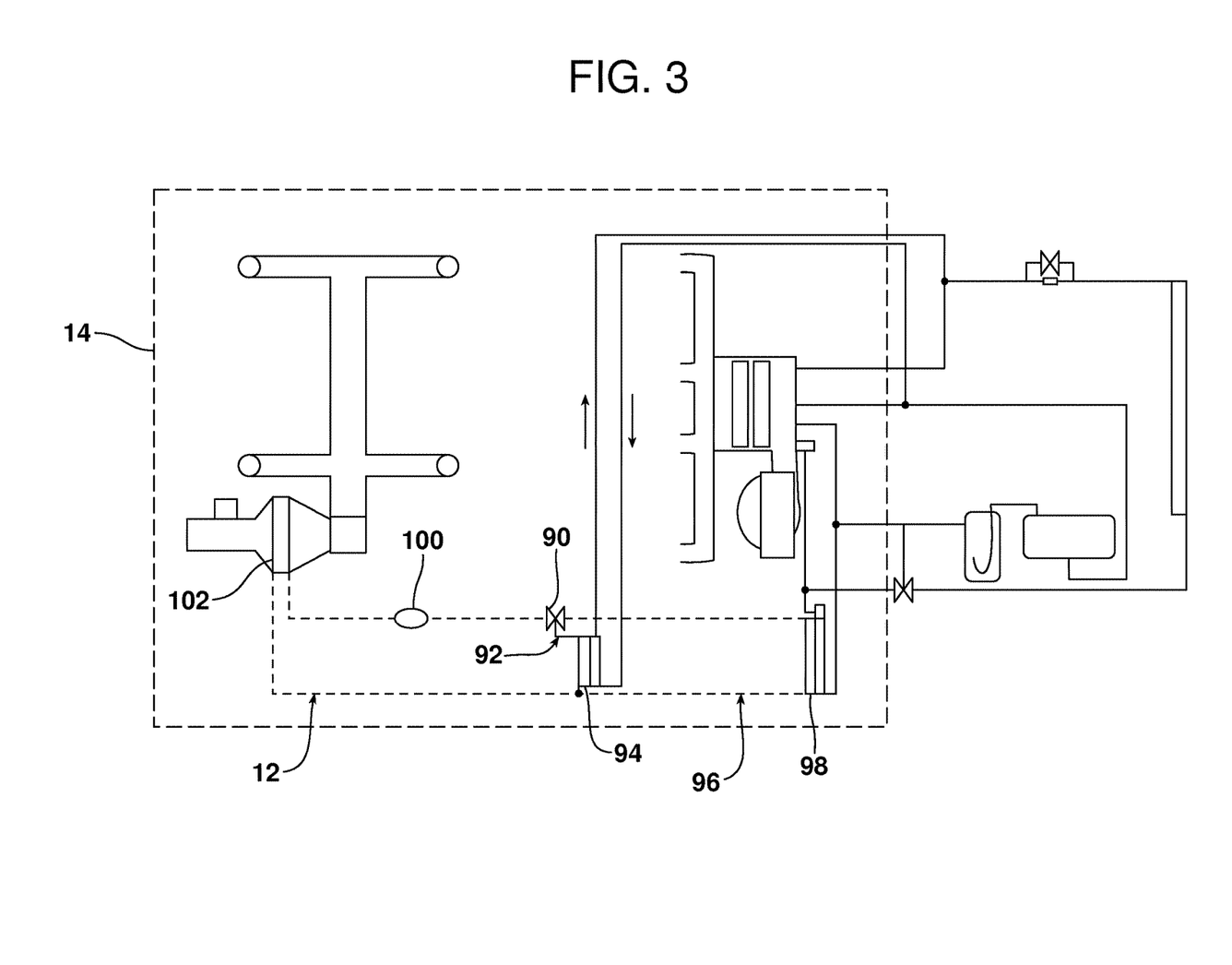
FIG. 3 is a schematic diagram of the vehicle HVAC system having an auxiliary coolant loop for heating and/or cooling at least a portion of a passenger compartment with a cooling loop connected in parallel with a heating loop for use individually to provide cooling or heating, or together to provide a blended coolant temperature.

In an alternate embodiment shown in FIG. 3, a two-way valve 90 replaces the flow control valve 72 in the auxiliary coolant loop 12. The two-way valve 90 controls movement of the coolant through a heating loop 92 that includes a hot refrigerant to coolant heat exchanger 94 and a cooling loop 96 that includes a refrigerant to coolant heat exchanger 98. In this embodiment, the heating loop 92 and the cooling loop 96 are connected in parallel and a pump 100 is positioned between a coolant to air heat exchanger 102 and the two-way valve 90. In this manner, the two-way valve 90 can be used to bypass the heating loop 92 in a cooling mode or the cooling loop 96 in a heating mode.

Alternatively, the two-way valve 90 can be utilized to blend coolant from both the heating loop 92 and the cooling loop 96 to control a temperature of the coolant being pumped to the coolant to air heat exchanger 102 and necessarily, a temperature of air in the passenger compartment. Even more, the pump 100 may be positioned between the hot refrigerant to coolant heat exchanger 94 and the coolant to air heat exchanger 102, or more than one pump could be utilized within the auxiliary coolant loop.

Figure 4:
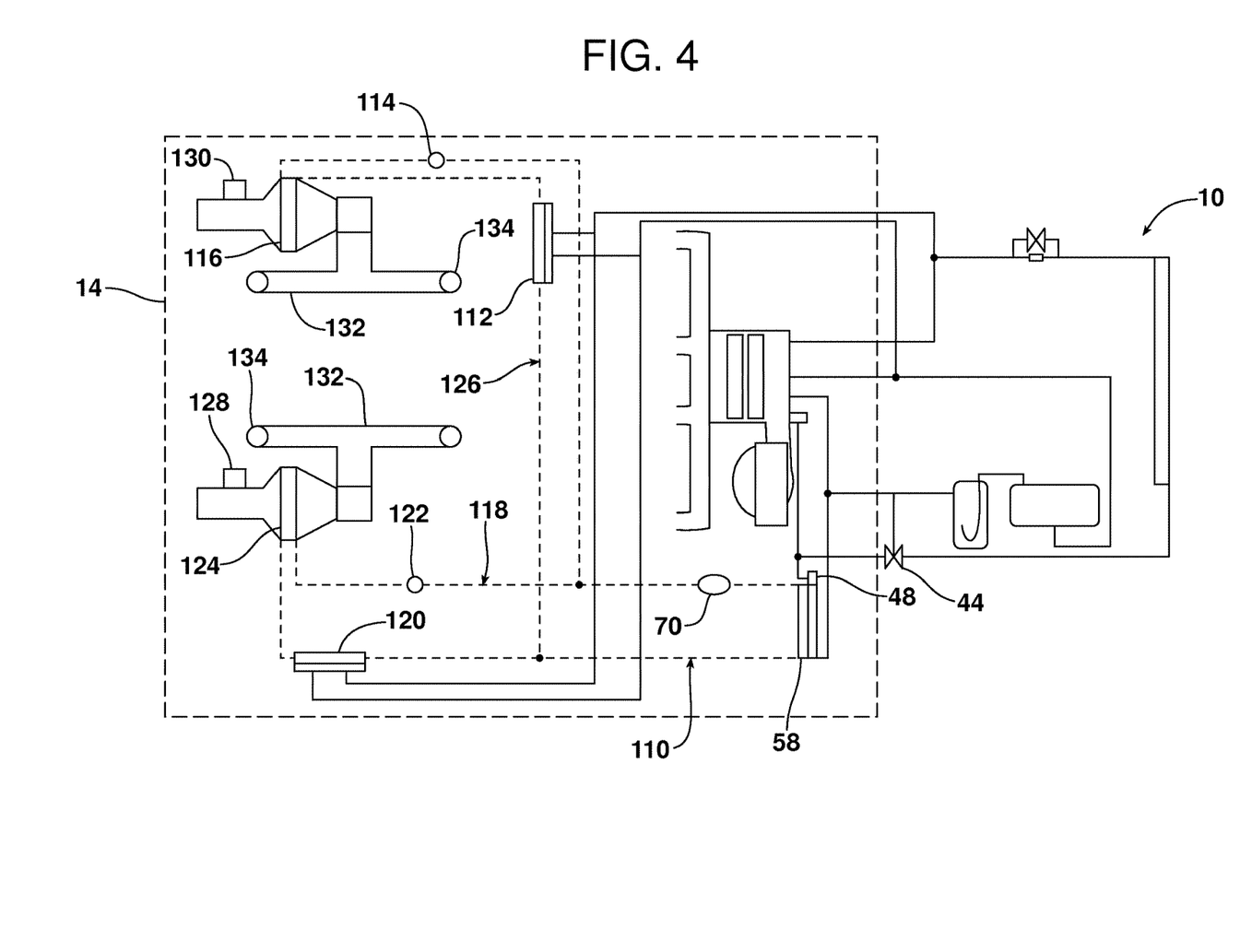
FIG. 4 is a schematic diagram of a vehicle HVAC system having an auxiliary coolant loop for heating and/or cooling at least a portion of a passenger compartment with two zone loops for heating and/or cooling two zones within the passenger compartment.

In another alternate embodiment shown in FIG. 4, an auxiliary coolant loop 110 includes a second hot refrigerant to coolant heat exchanger 112, flow control valve 114, and coolant to air heat exchanger 116 in a dual zone configuration. In this configuration, a first zone loop 118 including a first hot refrigerant to coolant heat exchanger 120, flow control valve 122, and coolant to air heat exchanger 124, is in parallel with a second zone loop 126 including the second hot refrigerant to coolant heat exchanger 112, flow control valve 114, and coolant to air heat exchanger 116. This dual loop configuration allows for heating and/or cooling within two zones of a passenger compartment 14.

As described above, a pump 70 moves coolant through a refrigerant to coolant heat exchanger 58. In the cooling mode, the third (cooling) expansion device 48 expands the liquid refrigerant to become a low-temperature, low-pressure liquid and vapor mixture refrigerant. This low-temperature, low-pressure liquid and vapor mixture refrigerant is supplied to the refrigerant to coolant heat exchanger 58 associated with the auxiliary cooling loop 110 where heat is transferred from the coolant within the auxiliary coolant loop to the refrigerant. In the heating mode, the low pressure, liquefied refrigerant is sent through the two-way valve 44 as described in FIG. 2 which routes the refrigerant straight to the accumulator 64. Since no refrigerant is moving through the second (cooling) expansion device 48 or the refrigerant to coolant heat exchanger 58, the coolant moving within the auxiliary coolant loop 110 remains warmed by the transfer of heat within the hot refrigerant to coolant heat exchangers 112 and 120.

As described above, a first blower 128 in the dual zone configuration selectively creates a flow of air across the first coolant to air heat exchanger 124 and a second blower 130 selectively creates a flow of air across the second coolant to air heat exchanger 116. The warm, moist air flowing across the coolant to air heat exchangers transfers its heat to the cooler coolant within the coolant to air heat exchangers in the cooling mode. The cooled air flows into ducting 132 and out one or more vents 134 positioned within the passenger compartment 14. This process results in the passenger compartment 14 having a cooler, drier air therein in the cooling mode. In the heating mode, the cool air flowing across the coolant to air heat exchangers absorbs heat from the warmer coolant within the coolant to air heat exchangers and out the ducting 132 into the passenger compartment 14.

In even more alternate embodiments, the auxiliary coolant loop may include one or more additional zone loops to provide individualized heating and/or cooling within a plurality of zones within the passenger compartment. As described above, each additional zone loop may include an additional refrigerant to coolant heat exchanger, flow control valve, and coolant to air heat exchanger. Even more, each zone loop of the plurality of zone loops is configured in parallel with the remaining zone loops. This plurality loop configuration allows for heating and/or cooling within the plurality of zones of the passenger compartment. For example, a passenger in the third row could request warmer air from an associated coolant to air heat exchanger and blower while another passenger in the second row could request no air, or cooler air from another associated coolant to air heat exchanger and blower.

Figure 5:
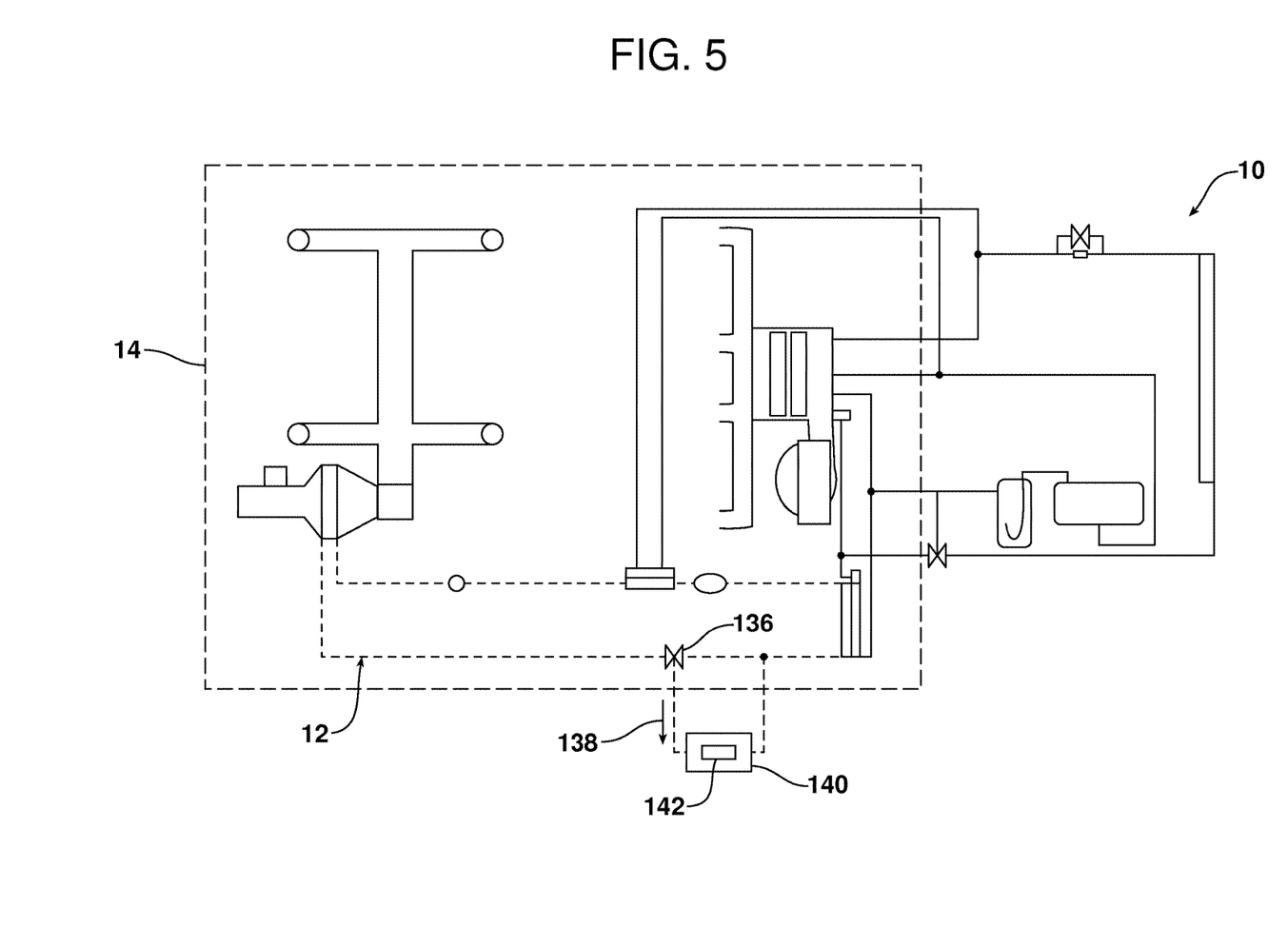
FIG. 5 is a schematic diagram of a vehicle HVAC system having an auxiliary coolant loop for heating and/or cooling at least a portion of a passenger compartment with a two-way valve for selectively directing coolant through a compartment housing a component for cooling the component.

In another alternate embodiment shown in FIG. 5, a two-way valve 136 is added to the auxiliary coolant loop 12 for selectively directing the moving coolant, as shown by action arrow 138, through a compartment 140 for housing a component 142 therein in order to regulate a temperature of the component (e.g., a battery pack). The two-way valve 136 operates to allow the coolant to move normally within the auxiliary coolant loop 12 or to be diverted through the compartment 140 when component cooling is desired. Of course, one or more valves may be added to the auxiliary coolant loop if multiple compartments are utilized within the vehicle.

In summary, numerous benefits result from the vehicle utilizing an auxiliary coolant loop for controlling a temperature within a passenger compartment and related method of heating and cooling at least one zone of the passenger compartment incorporating same as illustrated in this document. The auxiliary HVAC system provides heating and/or cooling within a passenger compartment or zones within the passenger compartment in a minimum package size. This provides increased flexibility for vehicle designers. The use of an auxiliary coolant loop system also allows for shorter duct runs for multi-zone air conditioning throughout the passenger compartment and the utilization of fewer and/or possibly smaller heat exchangers. Even more, the system allows for spot heating and cooling resulting in lower energy consumption compared to full passenger compartment solutions, and component cooling where components are temperature critical.

The foregoing has been presented for purposes of illustration and description. It is not intended to be exhaustive or to limit the embodiments to the precise form disclosed.

Obvious modifications and variations are possible in light of the above teachings. For example, the expansion devices in the described embodiment could be electronic expansion devices. All such modifications and variations are within the scope of the appended claims when interpreted in accordance with the breadth to which they are fairly, legally and equitably entitled.

What is claimed:

1. A vehicle, comprising:
   a heating, ventilation and air conditioning (HVAC) system, operable in a cooling mode and a heating mode, for heating and cooling a passenger compartment, said HVAC system including a refrigerant loop and an expansion device; and
   an auxiliary coolant loop including a pump, a first heat exchanger, a second heat exchanger, and a first flow control valve, a third heat exchanger, a fourth heat exchanger, a fifth heat exchanger and a second flow control valve wherein said pump moves a coolant through said auxiliary coolant loop and wherein said first heat exchanger is thermally coupled to said refrigerant loop in the cooling mode, said second heat exchanger and said fourth heat exchanger are positioned in said passenger compartment and said third heat exchanger and said fifth heat exchanger are thermally coupled to said refrigerant loop;
   wherein a first temperature of said coolant within said auxiliary coolant loop is controlled utilizing at least one of said (a) first flow control valve and (b) said pump and a second temperature of said coolant moving through said fourth heat exchanger is controlled utilizing said second flow control valve and said pump.

2. The vehicle of claim 1, wherein said second heat exchanger is a coolant to air heat exchanger.

3. The vehicle of claim 2, further comprising a blower for moving air through said second heat exchanger and into said passenger compartment.

4. The vehicle of claim 3, further comprising at least one vent through which the air enters said passenger compartment.

5. The vehicle of claim 1, wherein said first heat exchanger and said third heat exchanger are connected in parallel, said flow control valve is a two way valve for controlling the movement of coolant to said first heat exchanger and said third heat exchanger, and said pump is connected between said second heat exchanger and said flow control valve.

6. The vehicle of claim 1, wherein said fourth heat exchanger is a coolant to air heat exchanger, and further comprising a second blower for moving air through said fourth heat exchanger and into said passenger compartment.

7. The vehicle of claim 1, wherein said auxiliary coolant loop further includes a valve for selectively directing said moving coolant through a compartment for housing a component therein in order to regulate a temperature of the component.

* * * * *